US012724914B2

(12) United States Patent
Howarth et al.

(10) Patent No.: US 12,724,914 B2
(45) Date of Patent: Sep. 1, 2026

(54) DATA STRUCTURE TRANSMISSION VIA CROSS-SYSTEM SECURE LINKS

(71) Applicant: ADP, Inc., Roseland, NJ (US)

(72) Inventors: James Howarth, Staten Island, NY (US); Raj Shekhar, Parsippany, NJ (US); Tanuja Ghare, Parsippany, NJ (US); DeAnna Carey, Dexter, MI (US); Gianni Agodini, Rockaway, NJ (US)

(73) Assignee: ADP, Inc., Roseland, NJ (US)

( * ) Notice: Subject to any disclaimer, the term of this patent is extended or adjusted under 35 U.S.C. 154(b) by 178 days.

(21) Appl. No.: 18/635,910

(22) Filed: Apr. 15, 2024

(65) Prior Publication Data

US 2025/0322097 A1 Oct. 16, 2025

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01)

(58) Field of Classification Search
USPC .......................................................... 726/26
See application file for complete search history.

(56) References Cited

U.S. PATENT DOCUMENTS 7,630,986 B1 12/2009 Herz et al.
8,713,633 B2 4/2014 Thomas
9,349,021 B1 * 5/2016 Chaganti ................ G16H 10/60
9,762,553 B2 9/2017 Ford et al.
11,128,638 B2 9/2021 Mullins et al.
11,334,675 B2 5/2022 Andrews et al.
11,562,097 B2 1/2023 Brannon et al.
11,693,976 B2 7/2023 Dikhit et al.
2003/0172163 A1 * 9/2003 Fujita .................. H04L 67/1001 709/226
2016/0275199 A1 * 9/2016 Tanaka .................. G06F 16/951
2019/0066147 A1 * 2/2019 Jain .................... G06Q 30/0238
2021/0058251 A1 * 2/2021 Varadharajan ........ H04L 9/0643

OTHER PUBLICATIONS

Toal, et al., "Approaching Zero Trust Security with Oracle Cloud Infrastructure", Oracle, Jul. 2022, Version 1.2, 35 pages.

* cited by examiner

*Primary Examiner* — Sanchit K Sarker
(74) *Attorney, Agent, or Firm* — Foley & Lardner LLP

(57) ABSTRACT

Aspects of this technical solution can identify a request to transmit a data structure to an electronic address, where the request includes a first unique key for a first account that generates the data structure, and a second unique key for a second account for the electronic address, determine, from the second unique key, that the electronic address is authorized to receive the data structure, provide, responsive to the electronic address being authorized to receive the data structure, the data structure for storage on the data repository, identify a location of the data structure stored on the data repository, generate, from the location, a uniform resource link configured for access via the second account, and transmit the uniform resource link to a device for the second account to cause, responsive to an interaction with the uniform resource link, the device to access the data structure located on the data repository.

20 Claims, 4 Drawing Sheets

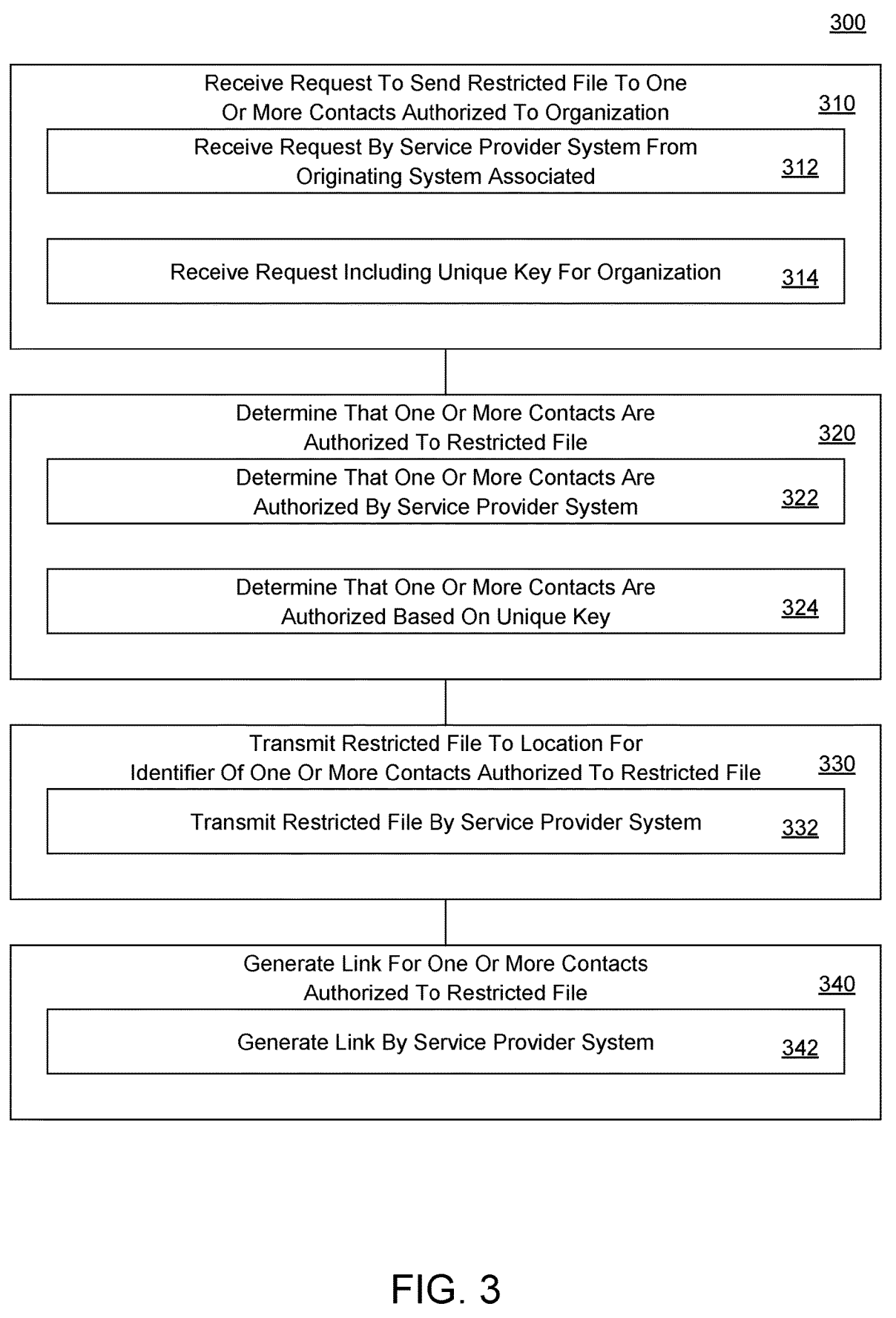

300

Receive Request To Send Restricted File To One Or More Contacts Authorized To Organization 310

Receive Request By Service Provider System From Originating System Associated 312

Receive Request Including Unique Key For Organization 314

Determine That One Or More Contacts Are Authorized To Restricted File 320

Determine That One Or More Contacts Are Authorized By Service Provider System 322

Determine That One Or More Contacts Are Authorized Based On Unique Key 324

Transmit Restricted File To Location For Identifier Of One Or More Contacts Authorized To Restricted File 330

Transmit Restricted File By Service Provider System 332

Generate Link For One Or More Contacts Authorized To Restricted File 340

Generate Link By Service Provider System 342

FIG. 3

DATA STRUCTURE TRANSMISSION VIA CROSS-SYSTEM SECURE LINKS

TECHNICAL FIELD

The present implementations relate generally to computer networks, including but not limited to, data structure transmission via cross-system secure links.

INTRODUCTION

Users increasingly demand secure communication involving sensitive data, and data providers are increasingly expected to provide secure communication at increasingly increasing granularity both within organizations and across organizations. Within organizations, data providers are expected to differentiate between individuals and roles, and expected to deliver sensitive information only to those authorized individuals and roles. Across organizations, data providers are expected to support a myriad of custom controls and policies for each organization and organizational unit, to provide data according to provider needs. However, conventional system cannot effectively perform secure communication at the demanded granularity and scale.

SUMMARY

Aspects of the technical solutions described herein are directed at least to individualized identification of authorized recipients to a restricted file according to policies of an origination system, and secure, independent transmission of both the restricted file and links to obtain the restricted file. For example, a service provider system can store documents corresponding to restricted files (e.g., employee data), and can identify authorized contacts to the restricted files according to recipients defined by one or more policies or rules at the origination system. For example, an origination system can be a customer-controlled system in which authorized recipients are defined or controlled. The service provider system can, upon identifying the authorized contacts, securely transmit the restricted files to a secure storage location, and generate one or more links according to the contacts, and according to one or more credentials (e.g., tokens) received from the originating system (e.g., purportedly from an authorized recipient). Upon verification, the authorized recipient can cause transmission of the restricted file from the secure storage location to the origination system. Thus, a technical solution for data structure transmission via cross-system secure links is provided.

At least one aspect is directed to a system. The system can include one or more processors, coupled with memory. The system can identify a request to transmit a data structure to an electronic address, where the request can include a first unique key corresponding to a first account that generates the data structure, and a second unique key corresponding to a second account associated with the electronic address. The system can determine, based on the second unique key, that the electronic address is authorized to receive the data structure. The system can provide, responsive to the determination that the electronic address is authorized to receive the data structure, the data structure to a data repository for storage on the data repository. The system can identify a location of the data structure stored on the data repository. The system can generate, based on the location, a uniform resource link configured for access via the second account. The system can transmit the uniform resource link to a device associated with the second account to cause, responsive to an interaction with the uniform resource link, the device to access the data structure located on the data repository.

At least one aspect is directed to a method. The method can include identifying a request to transmit a data structure to an electronic address, where the request can include a first unique key corresponding to a first account that generates the data structure, and a second unique key corresponding to a second account associated with the electronic address. The method can include determining, based on the second unique key, that the electronic address is authorized to receive the data structure. The method can include providing, responsive to the determination that the electronic address is authorized to receive the data structure, the data structure to a data repository for storage on the data repository. The method can include identifying a location of the data structure stored on the data repository. The method can include generating, based on the location, a uniform resource link configured for access via the second account. The method can include transmitting the uniform resource link to a device associated with the second account to cause, responsive to an interaction with the uniform resource link, the device to access the data structure located on the data repository.

At least one aspect is directed to a non-transitory computer readable medium can include one or more instructions stored thereon and executable by a processor. The processor can identify a request to transmit a data structure to an electronic address, where the request can include a first unique key corresponding to a first account that generates the data structure, and a second unique key corresponding to a second account associated with the electronic address. The processor can determine, by the processor and based on the second unique key, that the electronic address is authorized to receive the data structure. The processor can provide, by the processor and responsive to the determination that the electronic address is authorized to receive the data structure, the data structure to a data repository for storage on the data repository. The processor can identify, by the processor, a location of the data structure stored on the data repository. The processor can generate, by the processor and based on the location, a uniform resource link configured for access via the second account. The processor can transmit, by the processor, the uniform resource link to a device associated with the second account to cause, responsive to an interaction with the uniform resource link, the device to access the data structure located on the data repository.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

FIG. 3 depicts an example method of data structure transmission via cross-system secure links, according to this disclosure.

DETAILED DESCRIPTION

Figure 1:
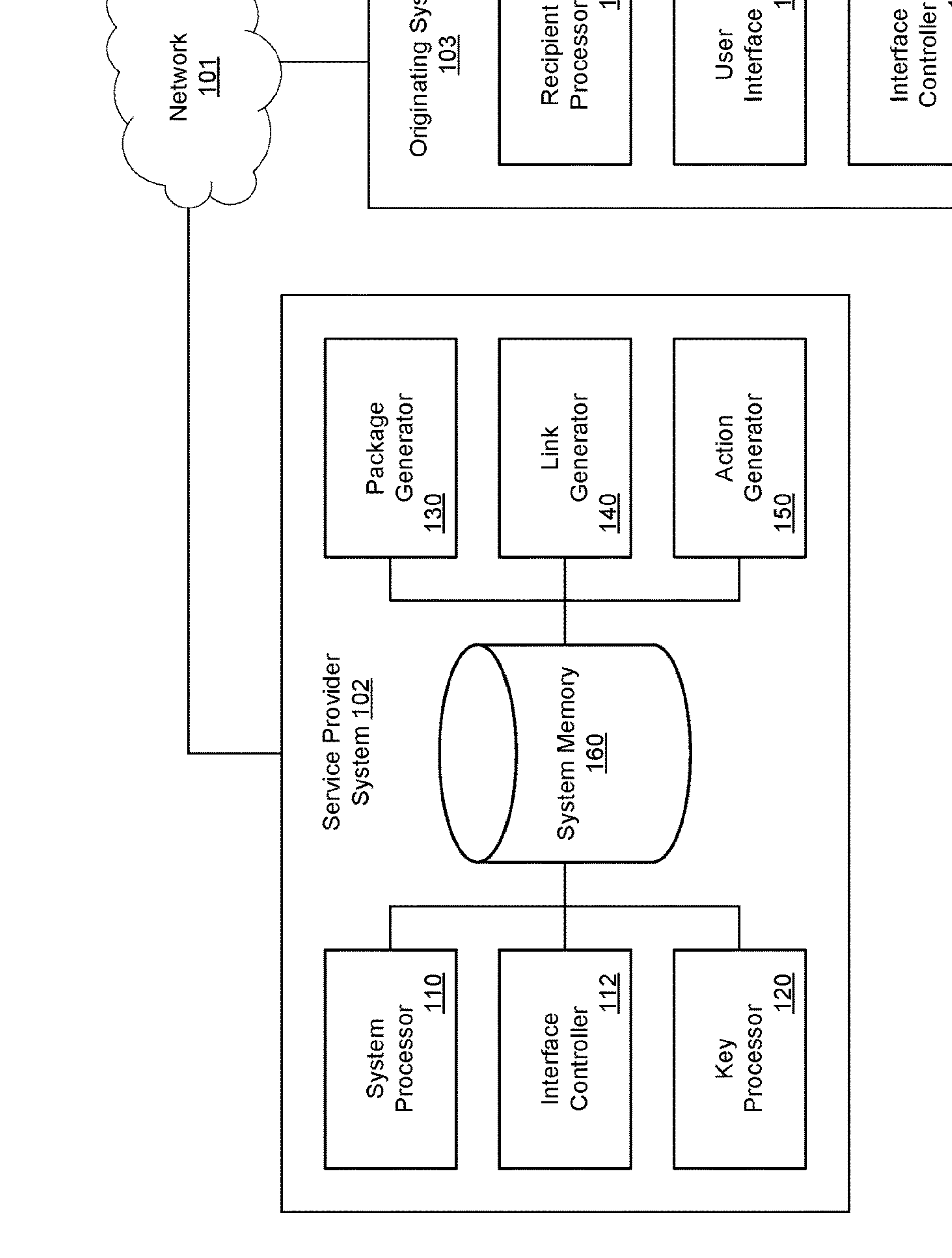
FIG. 1 depicts an example system, according to this disclosure.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Aspects of this disclosure are directed to a technical solution to securely transmit data (e.g., files0 among a plurality of computing environments via a network, where control of security is distributed across a plurality of the computing environments. For example, a plurality of computing environments can each respectively control sensitive data, user authorization to various domains or sensitive data, and secure common storage of sensitive data. For example, systems accessories to this disclosure can include a technical solution to communicatively operate securely to obtain authentication and authorization rules from a first computing environment (e.g., an originating system), apply the rules to identify electronic addresses (e.g., contacts or recipients) authorized to obtain discrete pieces of sensitive data (e.g., individual restricted files).

Thus, this technical solution can provide a plurality of technical improvements to increase security of communication in a cross-system setting that includes one or more computing environments. For example, this technical solution can provide at least a technical improvement to eliminate a need to transmit a restricted file (or any data structure) to all authorized devices and addresses directly from a computing environment that generates the restricted file. The technical improvement reduces network congestion and thus increases traffic speed, with respect to a reduction in redundant insecure file transmissions directly to an originating system by insecure means (e.g., email). Here, the technical solution can provide a technical improvement to operate a compute environment that generates the restricted file to transmit the file to a shared system (e.g., a data repository or a cloud storage system) without downloading the file directly to the originating system, and providing a secure, individualized link to the file instead. This saves network bandwidth by avoiding an entire download and upload cycle of the restricted file, also increasing file security.

FIG. 1 depicts an example system, according to this disclosure. As illustrated by way of example in FIG. 1, a system 100 can include one or more of a service provider system 102, an originating system 103, or a shared system 104. In an aspect, the system can include one or more processors, coupled with memory.

The service provider system 102 can include a physical computer system operatively coupled or coupleable with one or more components of the system 100. The service provider system 102 can include a virtual computing system, an operating system, and a communication bus to effect communication and processing. The service provider system 102 can include a system processor 110, an interface controller 112, a key processor 120, a package generator 130, a link generator 140, an action generator 150, and a system memory 160. In an aspect, the service provider system 102 is controlled by a service provider of one or more employee records, the originating system 103 is controlled by the organization, and the organization controls the one or more employee records. In an aspect, the service provider manages the one or more employee records on behalf of the organization, and the restricted file can include one or more documents corresponding to the one or more employee records.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the system 100 generally can include one or more communication bus controller to effect communication between the system processor 110 and the other elements of the system 100.

The interface controller 112 can link the service provider system 102 with one or more of the network 101 and the originating system 103, by one or more communication interfaces. A communication interface can include, for example, an application programming interface ("API") compatible with a particular component of the service provider system 102, or the originating system 103. The communication interface can provide a particular communication protocol compatible with a particular component of the service provider system 102 and a particular component of the originating system 103. The interface controller 112 can be compatible with particular content objects and can be compatible with particular content delivery systems corresponding to particular content objects, structures of data, types of data, or any combination thereof. For example, the interface controller 112 can be compatible with transmission of text data or binary data structured according to one or more metrics or data of the originating system 103.

In an aspect, the interface controller 112 can receive, by the service provider system from the originating system, the one or more contacts, in response to a request for any contacts associated with the restricted file. In an aspect, the interface controller 112 can transmit, by the service provider system to the originating system, the request for any contacts associated with the restricted file. In an aspect, the interface controller 112 can receive, by the service provider system from the originating system, an indication of the one or more contacts as recipients to receive the restricted file. In an aspect, the interface controller 112 can transmit, by the service provider system to the originating system, a request to select the recipients to receive the restricted file.

In an aspect, the key processor 120 can receive, by the service provider system 102 from the originating system 103, a token indicative of the request to send the restricted file. In an aspect, the key processor 120 can extract, by the service provider system 102 from the token, at least one of the first unique key or the second unique key from the token. In an aspect, the key processor 120 can determine, by the service provider system 102, whether the one or more contacts are associated with the restricted file. In an aspect, the package generator 130 can package, by the service provider system, the restricted file into the packaged restricted file according to the token. For example, the link generator 140 can generate one or more links for one or more contacts to the shared location. For example, the token can correspond to an authentication token valid at one or more of the service provider system 102, the originating system 103, and the shared system 103. For example, the key processor 120 can receive a token from the originating system 103 that is valid for obtaining data structures from the shared system 104 and the shared location 180. For example, the originating system 103 is authorized to both the data structure, (e.g., restricted file) and the service provider system 102 via a single sign on (SSO) architecture, and is already authorized to do so via the SSO architecture. The package generator 130 can, for example, determine a contact or electronic address associated with a contact for the restricted file, based on data of the restricted file or metadata associated with the restricted file (e.g., a pattern or signature associated with the file). As discussed herein, a restricted file can include any file selected or identified for transmission to the shared location 180, and is not limited any particular data content or data structure.

In an aspect, the action generator 150 can determine, by the service provider system 102, that no contacts are associated with the restricted file, where the originating system 103 is configured to automatically update recipients to receive the restricted file, in response to the determination by the service provider system 102 that no contacts are associated with the restricted file. For example, the action generator 150 can make one or more determinations as discussed herein, but this disclosure is not limited thereto.

The system memory 160 can store data associated with the service provider system 102. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, or a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device. In an aspect, the system memory 160 can correspond to a non-transitory computer readable medium. In an aspect, the non-transitory computer readable medium can include one or more instructions executable by the system processor 110.

The originating system 103 can include a computing system associated with a database system. For example, the originating system 103 can correspond to a cloud system, a server, a distributed remote system, or any combination thereof. For example, the originating system 103 can include an operating system to execute a virtual environment. The operating system can include hardware control instructions and program execution instructions. The operating system can include a high-level operating system, a server operating system, an embedded operating system, or a boot loader. The originating system 103 can include a recipient processor 170, a user interface 172, and an interface controller 174. In an aspect, the originating system 103 is configured to determine whether the one or more contacts are associated with the restricted file, according to one or more permissions of the originating system 103. In an aspect, the originating system 103 is configured to determine whether the one or more contacts are associated with the restricted file, according to one or more rules of the originating system 103.

For example, the recipient processor 170 can determine whether to automatically update one or more recipients. For example, the recipient processor 170 can update one or more recipients to receive the restricted file, based on one or more permissions or rules of the originating system. For example, the recipient processor 170 can receive one or more selections at a user interface indicating one or more recipients to receive the restricted file. For example, the recipient processor 170 can determine one or more contacts matching the one or more recipients to receive the restricted file.

The user interface 172 can include one or more devices to receive input from a user or to provide output to a user. For example, the user interface 172 can correspond to a display device to provide visual output to a user and one or more or user input devices to receive input from a user. For example, the input devices can include a keyboard, mouse or touch-sensitive panel of the display device, but are not limited thereto. The display device can display at least one or more presentations as discussed herein, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The display device can be housed at least partially within the originating system 103.

The interface controller 174 can link the service provider system 102 with one or more of the network 101 and the originating system 103, by one or more communication interfaces. A communication interface can include, for example, an application programming interface ("API") compatible with a particular component of the service provider system 102, or the originating system 103. The communication interface can provide a particular communication protocol compatible with a particular component of the service provider system 102 and a particular component of the originating system 103. The interface controller 112 can be compatible with particular content objects and can be compatible with particular content delivery systems corresponding to particular content objects, structures of data, types of data, or any combination thereof. For example, the interface controller 112 can be compatible with transmission of text data or binary data structured according to one or more metrics or data of the service provider system 102.

The shared system 104 can include a computing system associated with a database system. For example, the originating system 103 can correspond to a cloud system, a server, a distributed remote system, or any combination thereof. For example, the originating system 103 can include an operating system to execute a virtual environment. The operating system can include hardware control instructions and program execution instructions. The operating system can include a high-level operating system, a server operating system, an embedded operating system, or a boot loader. The shared system 104 can include a shared location 180, and an interface controller 182. For example, the shared system 104 is a remote cloud storage system, a network-attached storage (NAS) system, or any combination thereof.

The shared location 180 can store data associated with the shared system 104. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, or a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device. In an aspect, the system memory 160 can correspond to a non-transitory computer readable medium. In an aspect, the non-transitory computer readable medium can include one or more instructions executable by the system processor 110.

The interface controller 182 can link the shared system 104 with one or more of the network 101 and the originating system 103, by one or more communication interfaces. A communication interface can include, for example, an application programming interface ("API") compatible with a particular component of the service provider system 102, or the originating system 103. The communication interface can provide a particular communication protocol compatible with a particular component of the service provider system 102 and a particular component of the originating system 103. The interface controller 182 can be compatible with particular content objects and can be compatible with particular content delivery systems corresponding to particular content objects, structures of data, types of data, or any combination thereof. For example, the interface controller 182 can be compatible with transmission of text data or binary data structured according to one or more metrics or data of the service provider system 102.

In an aspect, the system can identify the electronic address, in response to a request for any electronic address associated with the data structure. In an aspect, the system can transmit the request for any electronic address associated with the data structure to an external system. In an aspect, the system can package the data structure for delivery. The system can transmit the packaged data structure to the data repository. In an aspect, the system can determine that no electronic address is associated with the data structure, according to a configuration to automatically update an electronic address for a recipient to receive the data structure. In an aspect, the system can determine that the electronic address is associated with the data structure, according to one or more permissions of an originating system. In an aspect, the system can determine that the electronic address is associated with the data structure, according to one or more rules of the originating system. In an aspect, the system can receive an indication of the electronic address as recipient addresses to receive the data structure.

In an aspect, the system can transmit a request to select the recipient addresses to receive the data structure. In an aspect, the system can receive a token indicative of a request to send the data structure. In an aspect, the system can extract at least one of the first unique key or the second unique key from the token. In an aspect, the system can package the data structure into a packaged data structure according to the token. In an aspect, the service provider system is controlled by a service provider of one or more employee records, the originating system is controlled by the organization, and the organization controls the one or more employee records. In an aspect, the service provider manages the one or more employee records on behalf of the organization, and the data structure can include one or more documents corresponding to the one or more employee records.

Figure 2:
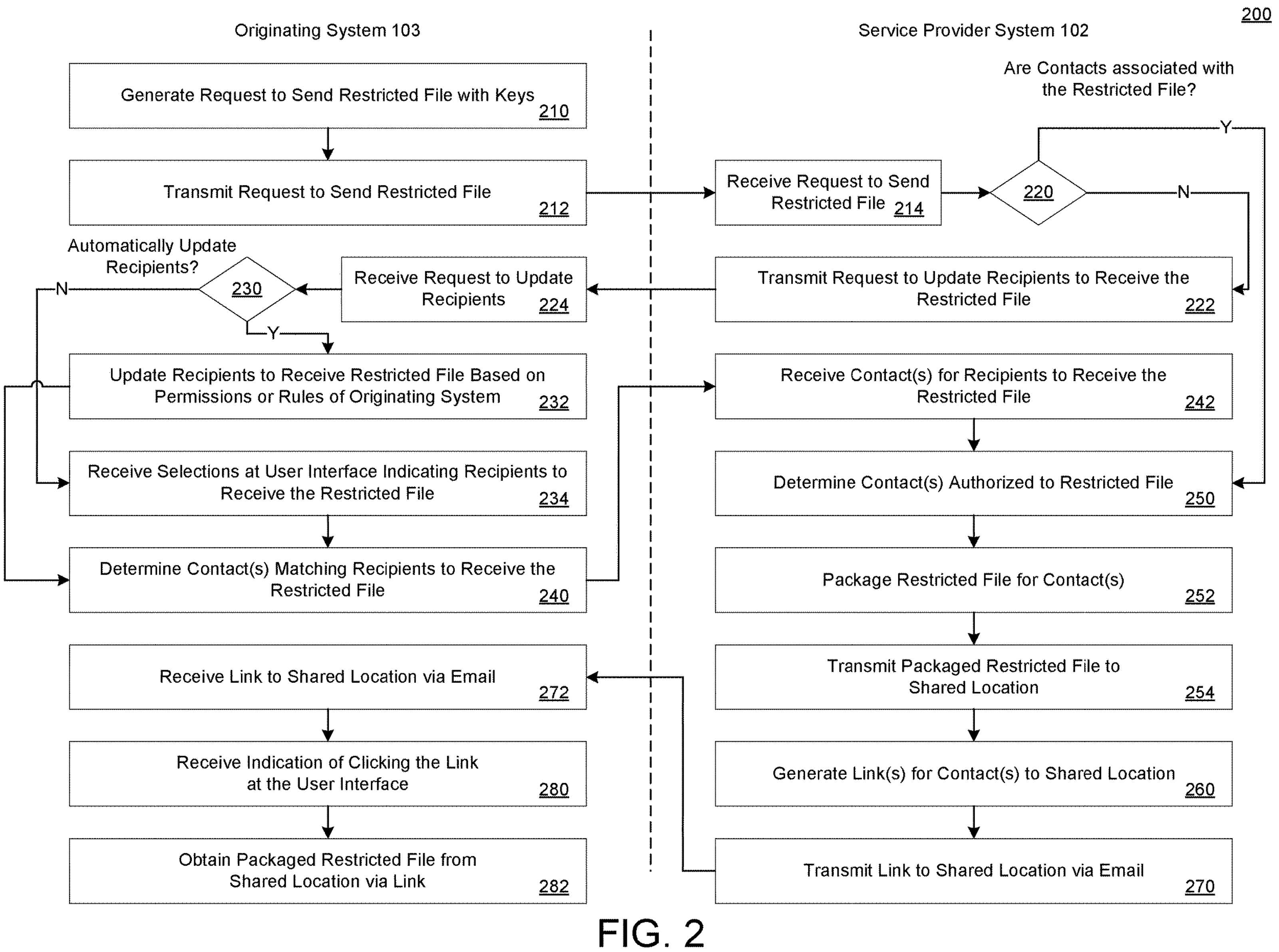
FIG. 2 depicts an example method of providing a restricted file via a shared location, according to this disclosure.

FIG. 2 depicts an example method of providing a restricted file via a shared location, according to this disclosure. At least one of the system 100, the service provider system 102, the originating system 103, or any combination thereof, or any component thereof, can perform method 200. This disclosure is not limited to execution by or according to any systems (e.g., the service provider system 102 or the originating system 103) as illustrated herein by way of example in method 200 of FIG. 2.

At 210, the method 200 can generate a request to send restricted file with one or more keys. For example, the originating system 103 can generate a request to send restricted file with one or more keys. At 212, the method 200 can transmit request to send restricted file. For example, the originating system 103 can transmit request to send restricted file. At 214, the method 200 can receive the request to send restricted file. For example, the service provider system 102 can receive the request to send restricted file. At 220, the method 200 can determine whether one or more contacts are associated with the restricted file. For example, the service provider system 102 can determine whether one or more contacts are associated with the restricted file. At 222, the method 200 can transmit a request to update one or more recipients to receive the restricted file. For example, the service provider system 102 can transmit a request to update one or more recipients to receive the restricted file. At 224, the method 200 can receive a request to update one or more recipients. For example, the originating system 103 can receive a request to update one or more recipients.

At 230, the method 200 can determine whether to automatically update one or more recipients. For example, the originating system 103 can determine whether to automatically update one or more recipients. At 232, the method 200 can update one or more recipients to receive the restricted file, based on one or more permissions or rules of the originating system. For example, the originating system 103 can update one or more recipients to receive the restricted file, based on one or more permissions or rules of the originating system. At 234, the method 200 can receive one or more selections at a user interface indicating one or more recipients to receive the restricted file. For example, the originating system 103 can receive one or more selections at a user interface indicating one or more recipients to receive the restricted file. At 240, the method 200 can determine one or more contacts matching the one or more recipients to receive the restricted file. For example, the originating system 103 can determine one or more contacts matching the one or more recipients to receive the restricted file. At 242, the method 200 can receive one or more contacts for the one or more recipients to receive the restricted file. For example, the service provider system 102 can receive one or more contacts for the one or more recipients to receive the restricted file.

At 250, the method 200 can determine one or more contacts authorized to the restricted file. For example, the service provider system 102 can determine one or more contacts authorized to the restricted file. At 252, the method 200 can package the restricted file for the one or more contacts. For example, the service provider system 102 can package the restricted file for the one or more contacts. At 254, the method 200 can transmit the packaged restricted file to a shared location. For example, the service provider system 102 can transmit the packaged restricted file to a shared location. At 260, the method 200 can generate one or more links for one or more contacts to the shared location. For example, the service provider system 102 can generate one or more links for one or more contacts to the shared location. At 270, the method 200 can transmit a link to the shared location via email. For example, the service provider system 102 can transmit a link to the shared location via email. At 272, the method 200 can receive the link to the shared location via email. For example, one or more client devices each associated with one or more recipients can receive the link to the shared location via email. For example, the originating system 103 can receive the link to the shared location via email. At 280, the method 200 can receive an indication of a click event at the link via the user interface. For example, the service provider system 102 can receive an indication of a click event at the link via the user interface. For example, the originating system 103 can receive an indication of a click event at the link via the user interface. At 282, the method 200 can obtain the packaged restricted file from the shared location via the link. For example, the one or more client devices each associated with the one or more recipients can obtain the packaged restricted file from the shared location via the link. For example, the originating system 103 can obtain the packaged restricted file from the shared location via the link.

FIG. 3 depicts an example method of data structure transmission via cross-system secure links, according to this disclosure. At least one of the system 100, the service provider system 102, the originating system 103, or any combination thereof, or any component thereof, can perform method 300.

At 310, the method 300 can receive a request to send a restricted file to one or more contacts authorized to an organization. In an aspect, the request to send the restricted file can include a first unique key corresponding to the user. At 312, the method 300 can receive the request by a service provider system from an originating system associated. At 314, the method 300 can receive the request including a unique key for the organization. At 320, the method 300 can determine that the one or more contacts are authorized to the restricted file. At 322, the method 300 can determine that the one or more contacts are authorized by the service provider system. At 324, the method 300 can determine that the one or more contacts are authorized based on the unique key.

In an aspect, the method 300 can include packaging, by the service provider system, the restricted file for delivery. The method 300 can include transmitting, by the service provider system, the packaged restricted file to the location. At 330, the method 300 can transmit the restricted file to a location for an identifier of the one or more contacts authorized to the restricted file. At 332, the method 300 can transmit the restricted file by the service provider system. In an aspect, the location corresponds to a network location accessible by the service provider system and the originating system. At 340, the method 300 can generate a link for the one or more contacts authorized to the restricted file. At 342, the method 300 can generate the link by the service provider system.

Figure 4:
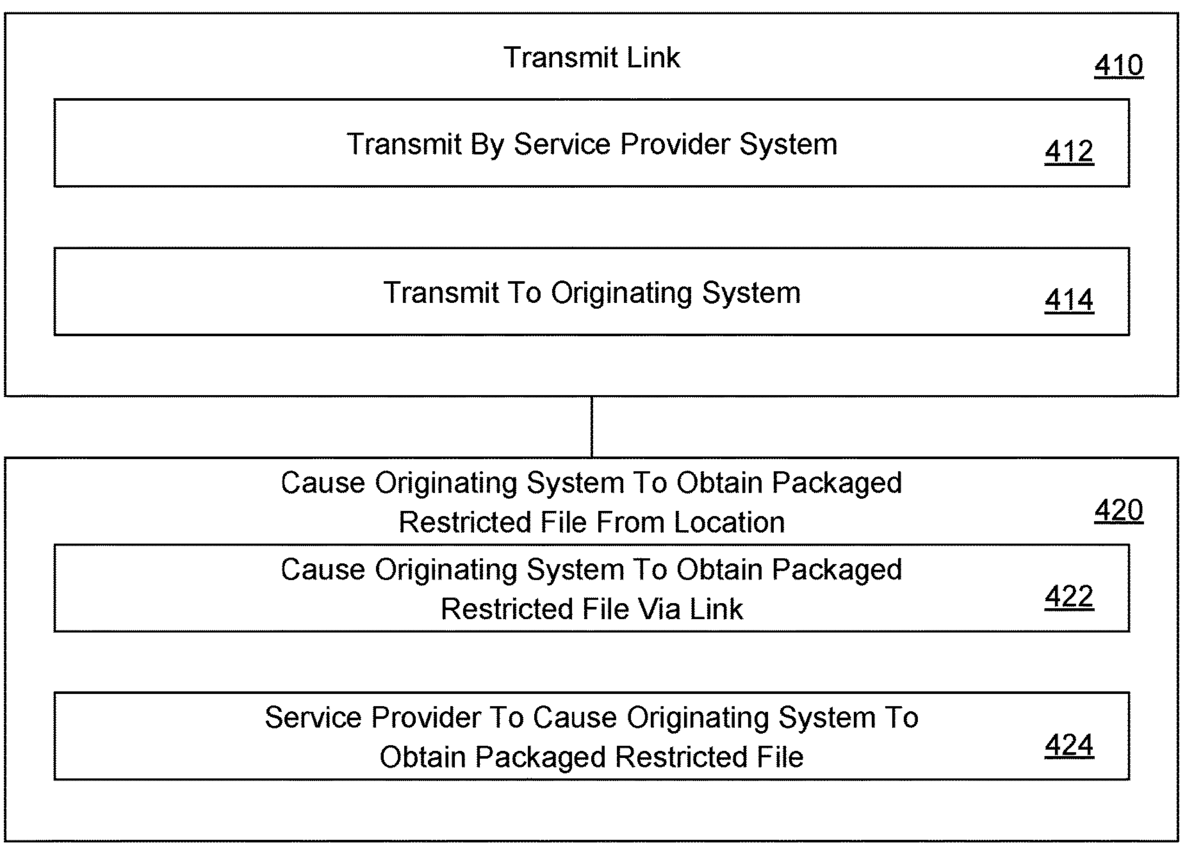
FIG. 4 depicts an example method of data structure transmission via cross-system secure links, according to this disclosure.

FIG. 4 depicts an example method of data structure transmission via cross-system secure links, according to this disclosure. At least one of the system 100, the service provider system 102, the originating system 103, or any combination thereof, or any component thereof, can perform method 400.

At 410, the method 400 can transmit the link. In an aspect, the method can include transmitting the link via email, where the originating system to obtain is configured to obtain the restricted file in response to receiving an indication of clicking the link in the email and providing the identifier of the one or more contacts authorized to the restricted file. At 412, the method 400 can transmit by the service provider system. At 414, the method 400 can transmit to the originating system. At 420, the method 400 can cause the originating system to obtain the packaged restricted file from the location. At 422, the method 400 can cause the originating system to obtain the packaged restricted file via the link. At 424, the method 400 can the service provider to cause the originating system to obtain the packaged restricted file.

In an aspect, the method can include packaging the data structure for delivery. The method can include transmitting the packaged data structure to the location. In an aspect, the request to transmit the data structure can include the first unique key. In an aspect, the location corresponds to a network location accessible by the service provider system and the originating system. In an aspect, the method can include transmitting the uniform resource link via email, according to a configuration to obtain the data structure in response to receiving an indication of clicking the link in the email and providing the identifier of the electronic address authorized to the data structure.

Having now described some illustrative implementations, the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any clam elements.

Scope of the systems and methods described herein is thus indicated by the appended claims, rather than the foregoing description. The scope of the claims includes equivalents to the meaning and scope of the appended claims.

What is claimed is:

1. A system, comprising:

one or more processors, coupled with memory, wherein the one or more processors execute instructions stored in the memory to:

identify a request to transmit a data structure to an electronic address, wherein the request includes a first unique key corresponding to an originating system that generates the data structure, and a second unique key corresponding to a recipient account associated with the electronic address;

determine, based on the second unique key, that the electronic address is authorized to receive the data structure according to a permission associated with the electronic address and defined by the originating system;

provide, responsive to the determination that the electronic address is authorized according to the permission to receive the data structure, the data structure to a data repository for storage on the data repository;

identify a storage location of the data structure stored on the data repository;

generate, using a service provider system, a uniform resource link that references the storage location, wherein the uniform resource link provides access to the data structure, the data repository is shared with the originating system and the service provider system; and transmit, based at least in part on the determination that the electronic address of the recipient account is authorized to receive the data structure, the uniform resource link to a device associated with the recipient account to cause, responsive to an interaction with the uniform resource link using the device, the device to receive the data structure from the data repository.

2. The system of claim 1, comprising the one or more processors to:

identify the electronic address, in response to a request for any electronic address associated with the data structure.

3. The system of claim 2, comprising the one or more processors to:

transmit the request for any electronic address associated with the data structure to an external system.

4. The system of claim 1, comprising the one or more processors to:

package the data structure for delivery; and transmit the packaged data structure to the data repository.

5. The system of claim 1, comprising the one or more processors to:

determine that no electronic address is associated with the data structure, according to a configuration to automatically update at least one electronic address for at least one recipient account to receive the data structure.

6. The system of claim 1, wherein the data structure corresponds to one or more restricted files.

7. The system of claim 1, comprising the one or more processors to:

determine that the electronic address is associated with the data structure, according to one or more rules of the originating system.

8. The system of claim 1, comprising the one or more processors to:

receive an indication of the electronic address as recipient addresses to receive the data structure.

9. The system of claim 8, comprising the one or more processors to:

transmit a request to select the recipient addresses to receive the data structure.

10. The system of claim 1, comprising the one or more processors to:

receive a token indicative of a request to send the data structure.

11. The system of claim 10, comprising the one or more processors to:

extract at least one of the first unique key or the second unique key from the token.

12. The system of claim 10, comprising the one or more processors to:

package the data structure into a packaged data structure according to the token.

13. The system of claim 1, wherein the service provider system is controlled by a service provider of one or more employee records, the originating system is controlled by an organization, and the organization controls the one or more employee records.

14. The system of claim 13, wherein the service provider manages the one or more employee records on behalf of the organization, and the data structure includes one or more documents corresponding to the one or more employee records.

15. A method, comprising:

identifying a request to transmit a data structure to an electronic address, wherein the request includes a first unique key corresponding to an originating system that generates the data structure, and a second unique key corresponding to a recipient account associated with the electronic address;

determining, based on the second unique key, that the electronic address is authorized to receive the data structure according to a permission associated with the electronic address and defined by the originating system;

providing, responsive to the determination that the electronic address is authorized to receive the data structure, the data structure to a data repository for storage on the data repository;

identifying a storage location of the data structure stored on the data repository;

generating, using a service provider system, a uniform resource link that references the storage location, wherein the uniform resource link provides access to the data structure, the data repository is shared with the originating system and the service provider system; and transmitting, based at least in part on the determination that the electronic address of the recipient account is authorized to receive the data structure, the uniform resource link to a device associated with the recipient account to cause, responsive to an interaction with the uniform resource link using the device, the device to receive the data structure from the data repository.

16. The method of claim 15, further comprising:

packaging the data structure for delivery; and transmitting the packaged data structure to the storage location.

17. The method of claim 15, wherein the request to transmit the data structure includes the first unique key.

18. The method of claim 15, wherein the storage location corresponds to a network location accessible by a service provider system and the originating system.

19. The method of claim 15, further comprising:

transmitting the uniform resource link via email, according to a configuration to obtain the data structure in response to receiving an indication of clicking the uniform resource link in the email and providing an identifier of the electronic address authorized to the data structure.

20. A non-transitory computer readable medium including one or more instructions stored thereon, wherein execution of the one or more stored instructions causes one or more processors to:

identify, by at least one processor, a request to transmit a data structure to an electronic address, wherein the request includes a first unique key corresponding to an originating system that generates the data structure, and a second unique key corresponding to a recipient account associated with the electronic address;

determine, by the at least one processor and based on the second unique key, that the electronic address is authorized to receive the data structure according to a permission associated with the electronic address and defined by the originating system;

provide, by the at least one processor and responsive to the determination that the electronic address is authorized to receive the data structure, the data structure to a data repository for storage on the data repository;

identify, by the at least one processor, a storage location of the data structure stored on the data repository;

generate, by the at least one processor and using a service provider system, a uniform resource link that references the storage location, wherein the uniform resource link provides access to the data structure, the data repository is shared with the originating system and the service provider system; and transmit, by the at least one processor, based at least in part on the determination that the electronic address of the recipient account is authorized to receive the data structure, the uniform resource link to a device associated with the recipient account to cause, responsive to an interaction with the uniform resource link using the device, the device to receive the data structure from the data repository.

* * * * *